(12) United States Patent
Choo

(10) Patent No.: US 11,046,597 B2
(45) Date of Patent: Jun. 29, 2021

(54) METHOD OF MEMBRANE-COUPLED ELECTROCHEMICAL ADVANCED OXIDATION AND ITS APPLICATION DEVICE FOR WATER PURIFICATION AND WATER PURIFICATION SYSTEM USING OF THE SAME

(71) Applicant: KYUNGPOOK NATIONAL UNIVERSITY INDUSTRY-ACADEMIC COOPERATION FOUNDATION, Daegu (KR)

(72) Inventor: Kwang Ho Choo, Daegu (KR)

(73) Assignee: KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 0 days.

(21) Appl. No.: 16/461,098

(22) PCT Filed: Nov. 16, 2017

(86) PCT No.: PCT/KR2017/013039
§ 371 (c)(1),
(2) Date: May 15, 2019

(87) PCT Pub. No.: WO2018/093179
PCT Pub. Date: May 24, 2018

(65) Prior Publication Data
US 2020/0055751 A1 Feb. 20, 2020

(30) Foreign Application Priority Data
Nov. 16, 2016 (KR) .......... 10-2016-0152916

(51) Int. Cl.
*B01D 63/06* (2006.01)
*B01D 63/08* (2006.01)
(Continued)

(52) U.S. Cl.
CPC ............ *C02F 1/4672* (2013.01); *B01D 63/02* (2013.01); *B01D 63/06* (2013.01); *B01D 63/08* (2013.01);
(Continued)

(58) Field of Classification Search
CPC .... B01D 65/02; B01D 65/08; B01D 2321/18; B01D 2321/185; C02F 1/4672; C02F 2201/4619; C02F 2201/4618
See application file for complete search history.

(56) References Cited

U.S. PATENT DOCUMENTS 5,162,077 A * 11/1992 Bryan .................... G01N 27/38
204/402
2004/0188339 A1* 9/2004 Murkute ................ B01D 61/20
210/321.8
(Continued)

FOREIGN PATENT DOCUMENTS

KR 10-1998-0019270 A 6/1998
KR 10-2000-0013756 A 3/2000
(Continued)

OTHER PUBLICATIONS

Gang et al—KR 10-1998-0019270 Machine Translation—1998 (Year: 1998).*
(Continued)

*Primary Examiner* — Bradley R Spies
(74) *Attorney, Agent, or Firm* — NSIP Law

(57) ABSTRACT

The present invention relates to an electrochemical advanced oxidation process combined with a membrane in
(Continued)

which electrode reactions and membrane filtration occur simultaneously, a water treatment device based on the electrochemical advanced oxidation process, and a water treatment system using the water treatment device. The electrochemical advanced oxidation process includes: providing a membrane electro-oxidation tank where electrodes are combined with a membrane; accommodating wastewater containing pollutants in the membrane electro-oxidation tank; and supplying power to the electrodes to decompose the pollutants and simultaneously separating particles through the membrane (water treatment). The electrodes are arranged downstream of the membrane. Gases released from the electrodes induce a vertical flow of the fluid to improve the contact efficiency between a reactive solution and the electrodes and remove the pollutants attached to the surface of the membrane. According to the present invention, a mechanism of decomposing pollutants using the electrodes and a mechanism of separating particles through the membrane take place simultaneously, enabling effective removal of the pollutants. The electrodes are arranged downstream of the membrane. With this arrangement, gases are produced from the electrodes to improve the electrolysis reactivity and the filtration efficiency of the membrane.

13 Claims, 8 Drawing Sheets

(51) Int. Cl.
| | | |
|---|---|---|
| B01D 65/02 | (2006.01) | |
| B01D 65/08 | (2006.01) | |
| C02F 1/461 | (2006.01) | |
| C02F 1/467 | (2006.01) | |
| B01D 63/02 | (2006.01) | |
| B01D 71/02 | (2006.01) | |
| C02F 1/44 | (2006.01) | |

(52) U.S. Cl.
CPC ............ *B01D 65/02* (2013.01); *B01D 65/08* (2013.01); *B01D 71/025* (2013.01); *C02F 1/44* (2013.01); *C02F 1/46109* (2013.01); *B01D 2313/243* (2013.01); *B01D 2313/345* (2013.01); *C02F 2001/46133* (2013.01); *C02F 2201/4611* (2013.01); *C02F 2201/4618* (2013.01); *C02F 2201/4619* (2013.01); *C02F 2303/16* (2013.01)

(56) References Cited

U.S. PATENT DOCUMENTS

2006/0144700 A1* 7/2006 Carson .................. C02F 1/4672
204/252
2015/0344332 A1* 12/2015 Gu ............................ C25B 9/20
205/748

FOREIGN PATENT DOCUMENTS

| KR | 10-2007-0113131 A | | 11/2007 |
|---|---|---|---|
| KR | 10-0948197 B1 | | 3/2010 |
| KR | 10-1193902 B1 | | 10/2012 |
| KR | 20140027649 A | * | 3/2014 |
| WO | WO 01/51170 A1 | | 7/2001 |

OTHER PUBLICATIONS

Lim et al—KR 10-1193902 Machine Translation—2012 (Year: 2012).*
Park Kwang Kyu et al—KR20140027649A Machine Translation—Mar. 7, 2014 (Year: 2014).*
International Search Report dated Feb. 21, 2018 in counterpart International Application No. PCT/KR2017/013039 (2 pages in English, 2 pages in Korean).

* cited by examiner

[FIG. 1]
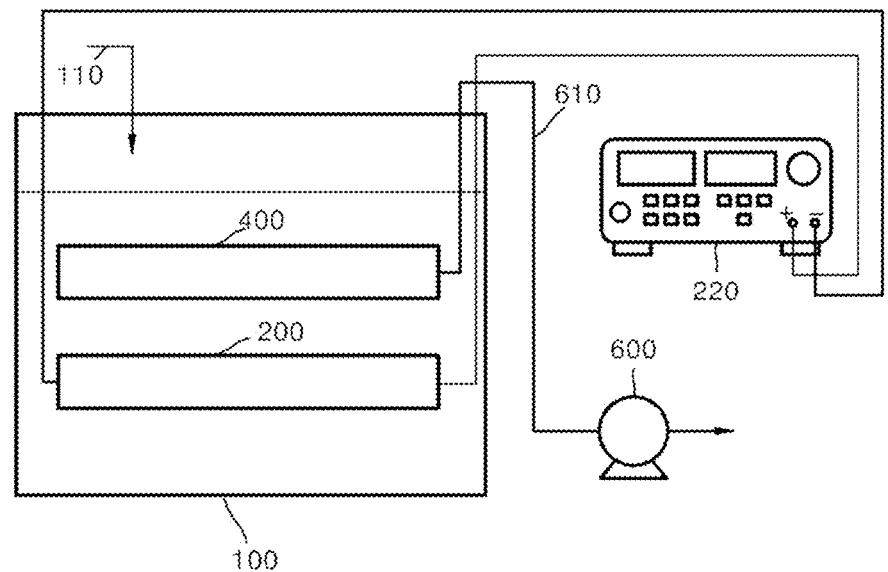
[FIG. 2]
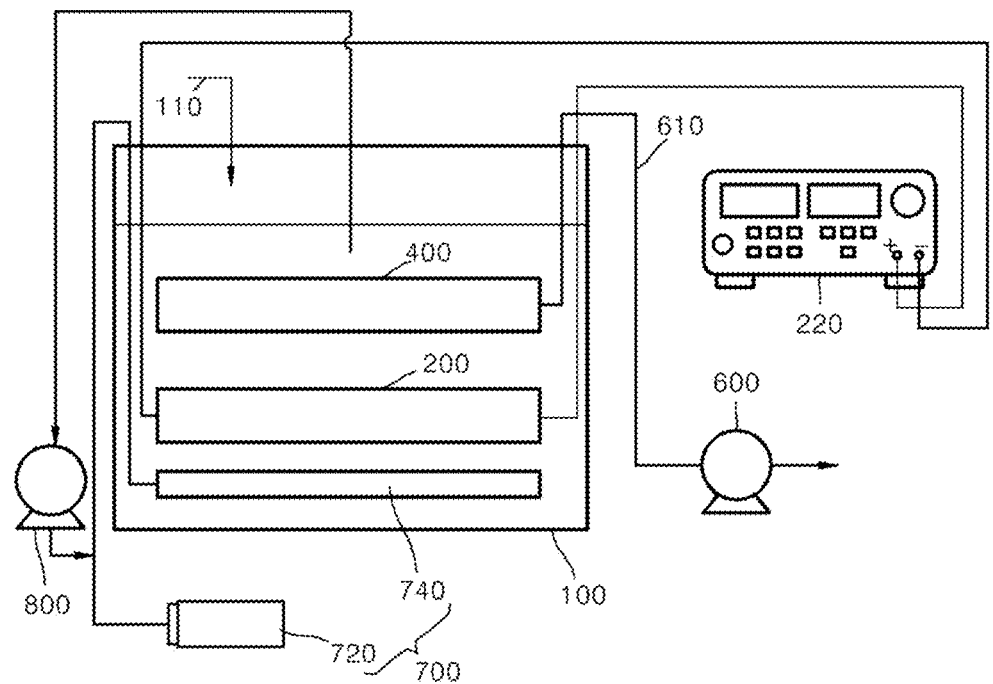

[FIG. 3]
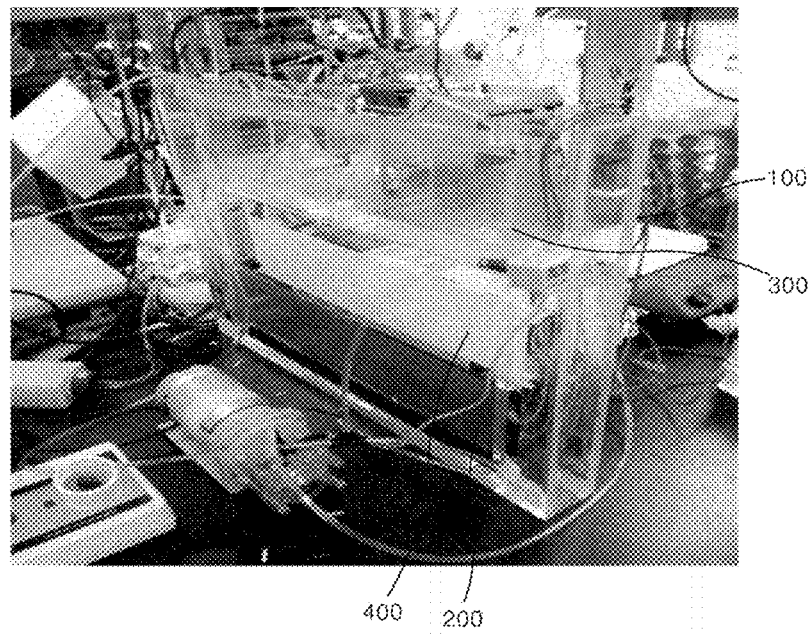
[FIG. 4]
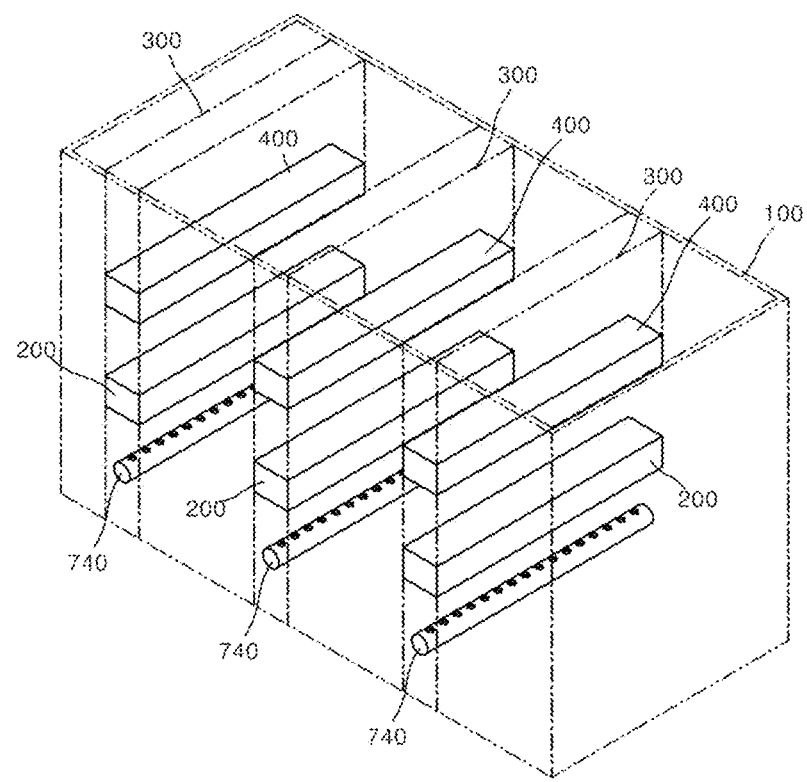

[FIG. 5]
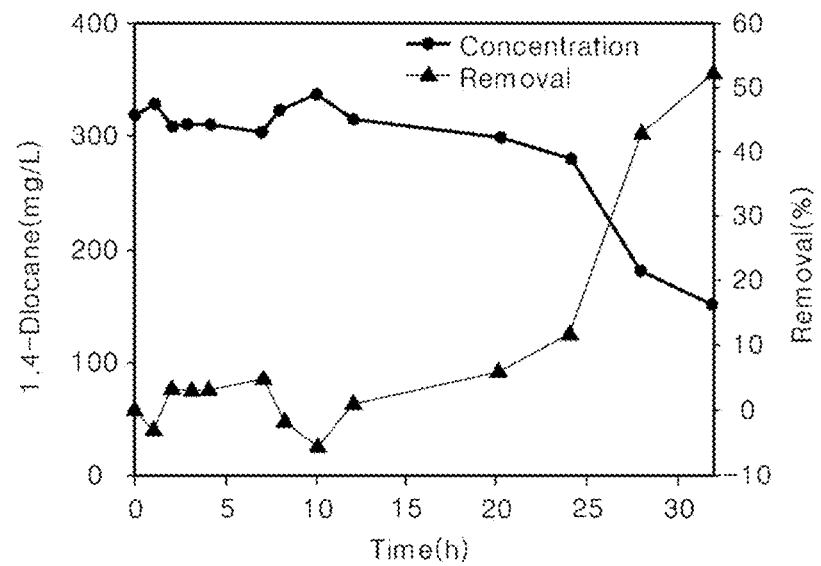
(a)
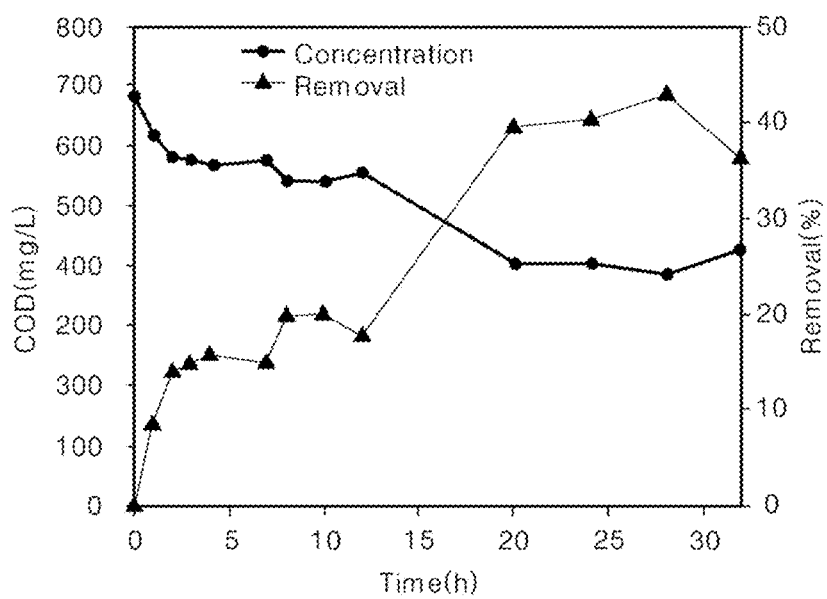
(b)

[FIG. 6]
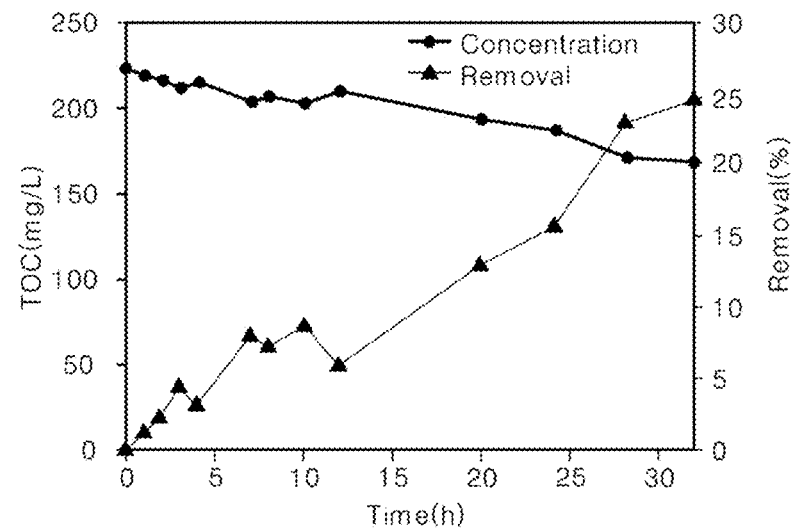
(c)
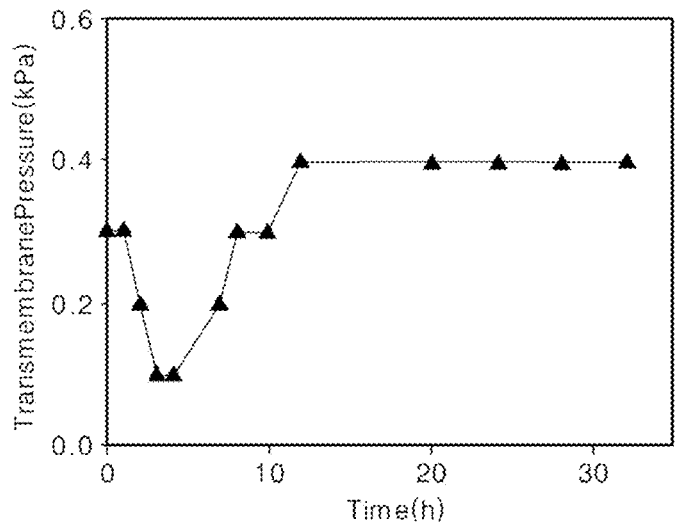
(d)

[FIG. 7]
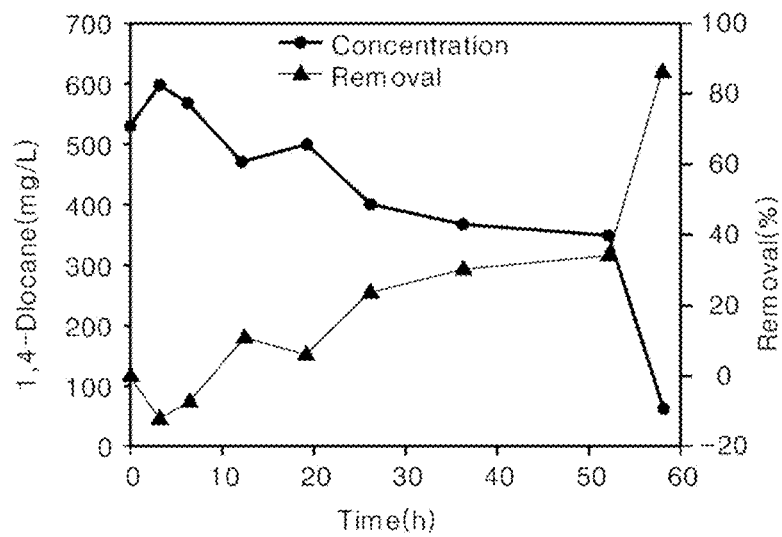
(a)
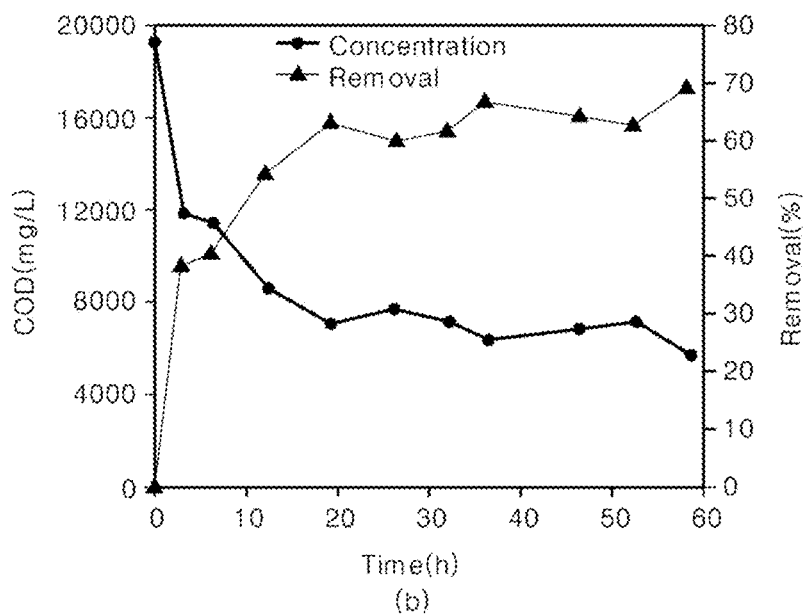
(b)

[FIG. 8]
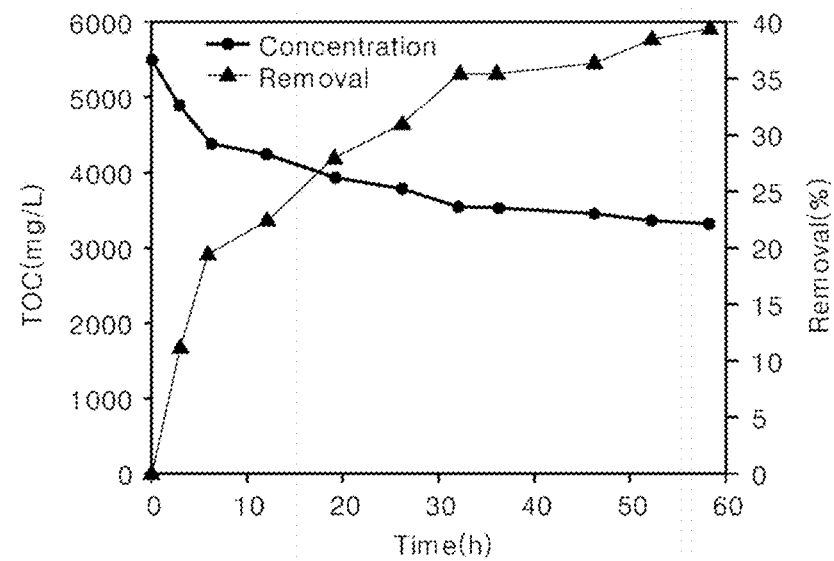
(c)
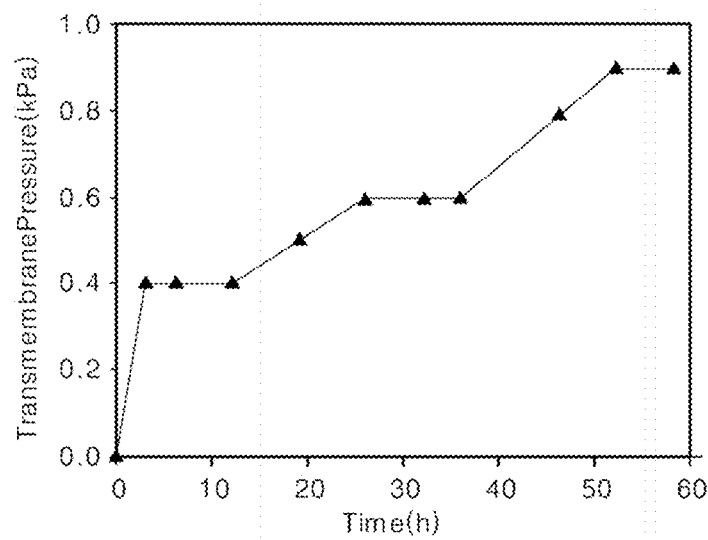
(d)

[FIG. 9]
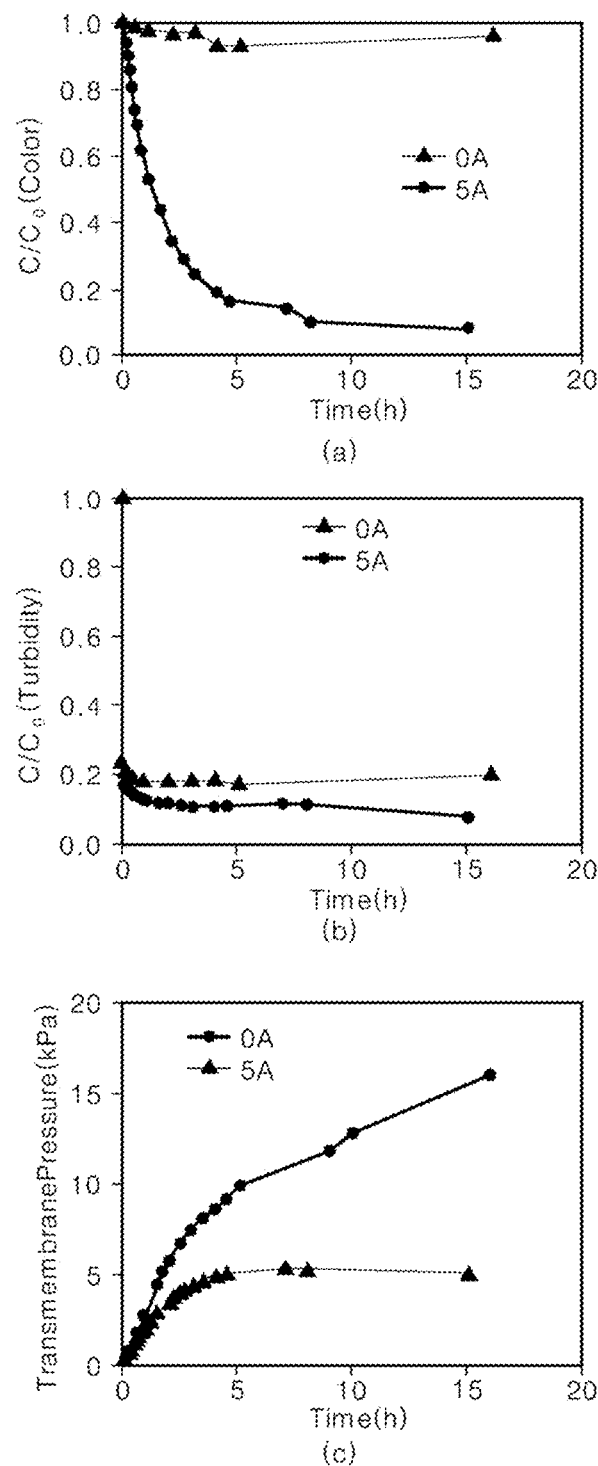

[FIG. 10]
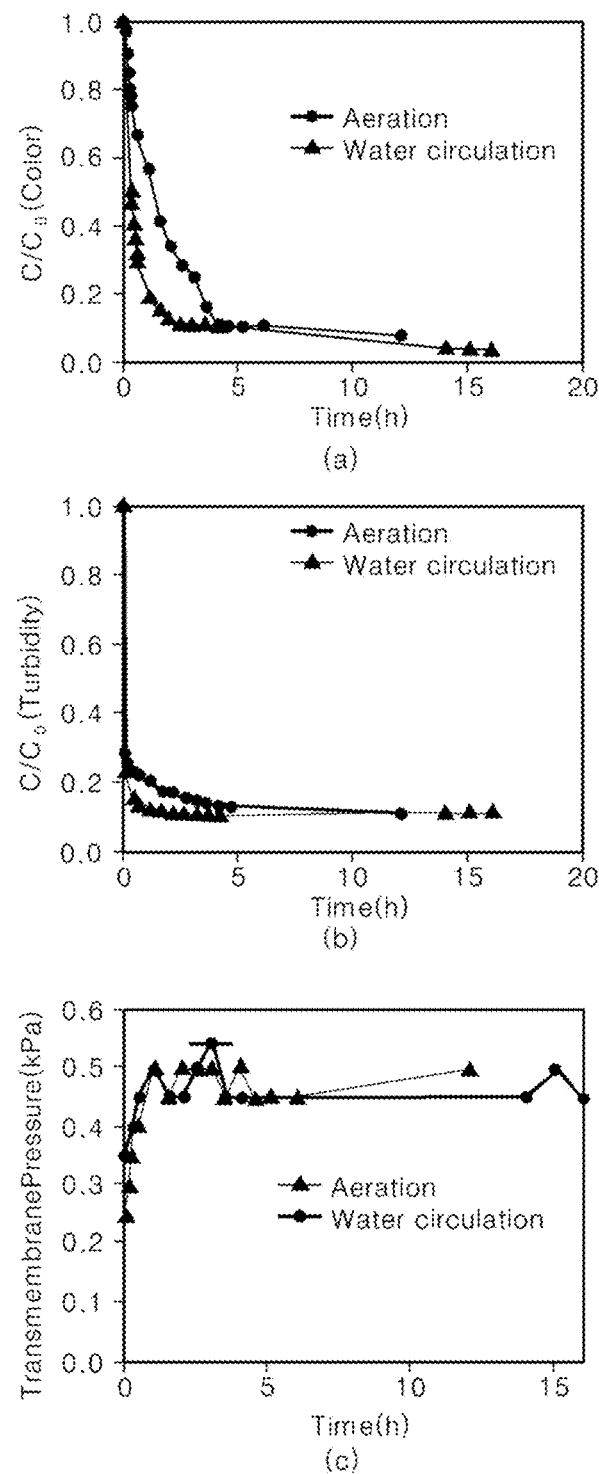

METHOD OF MEMBRANE-COUPLED ELECTROCHEMICAL ADVANCED OXIDATION AND ITS APPLICATION DEVICE FOR WATER PURIFICATION AND WATER PURIFICATION SYSTEM USING OF THE SAME

CROSS REFERENCE TO RELATED APPLICATIONS

This application is a U.S. National Stage Application of International Application No. PCT/KR2017/013039, filed on Nov. 16, 2017, which claims the benefit under 35 USC 119(a) and 365(b) of Korean Patent Application No. 10-2016-0152916, filed on Nov. 16, 2016, in the Korean Intellectual Property Office, the entire disclosures of which are incorporated herein by reference for all purposes.

TECHNICAL FIELD

The present invention relates to an electrochemical advanced oxidation process combined with a membrane in which electrode reactions and membrane filtration occur simultaneously, a water treatment device based on the electrochemical advanced oxidation process, and a water treatment system using the water treatment device.

BACKGROUND ART

Large and small water pollution incidents have been reported in areas around South Korea's major drinking water sources and four largest rivers. With recent advances in analytical techniques, the severity of water pollution problems caused by highly toxic and residual trace contaminants has been issued.

After the Nakdong river phenol contamination incident in 1991, the South Korean government and people have focused attention on water pollution and drinking water sources. Nevertheless, there have been continuous incidents and accidents caused by hazardous chemicals discharged from industrial complexes built along rivers. The concentrations of pharmaceuticals, hormones, and other trace contaminants in treated sewage water, surface water, and drinking water sources in South Korea have been detected at the level of at least few ppt up to several ppb.

Particularly, hazardous trace substances are present at ppb levels in sewage wastewater effluents. In severe cases, even very small amounts of hazardous substances released as a result of accidents may cause national or local disasters. Further, serious pollution incidents of water intake sources lead to national distrust of drinking water and require astronomical repair costs.

There has been an increasing social demand for the supply of drinking water with good quality as a basic human right for safe and healthy life. Studies on the degradation of trace contaminants in South Korea still remain in the basic stage or follow foreign advanced technology.

Current biological sewage wastewater treatment processes are not sufficient to remove hazardous trace substances and essentially involve additional processing steps, including advanced oxidation and adsorption for the removal of hazardous trace substances. Many membrane bioreactors (MBRs) for efficient and stable sewage wastewater treatment have recently been introduced and scaled up.

However, MBR processes based on the combination of biological treatment and membrane filtration are not sufficient to remove hazardous trace substances. Most hazardous substances are non-biodegradable and their molecular weight is at most a few hundreds, with the result that they pass through MBRs. For this reason, reverse osmosis for the removal of trace contaminants and $UV/H_2O_2$ treatment for disinfection are added downstream of micro/ultrafiltration for reuse.

Such processes are used in reuse systems such as GWRS (USA) and NEWater (Singapore). The State of California, USA, stipulates these three-stage reuse processes in Title 22. However, recent research results have revealed that some trace contaminants (including 1,4-dioxane and nitrosodimethylamine) pass through the above processes.

It is assumed that low molecular weight hazardous trace substances pass through reverse osmosis polymeric membranes by diffusion. Thus, there is an urgent need to develop a technique for effectively removing trace contaminants in sewage wastewater treatment, reuse, and water purification processes.

Studies on advanced oxidation processes for water treatment have been conducted based on ozone treatment, $UV/H_2O_2$ treatment, Fenton oxidation, photocatalysis, and electrochemical treatment in South Korea. No effective techniques for removing trace contaminants have emerged to date. Thus, the removal of trace contaminants is largely dependent upon outsourcing that involves a considerable cost. Chromaticity is one of the important issues other than particular components of treated industrial wastewater, particularly treated wastewater from the dye industry. Current biological sewage wastewater treatment is insufficient in removing chromaticity.

It is difficult to reduce the chromaticity (Pt—Co) of wastewater to 100 or less by typical biological treatment. Wastewater treatment by gravitational settling after simple biological treatment is not sufficient in removing fine particles, making it difficult to limit the turbidity of wastewater to 1 NTU or less.

Therefore, in the case where advanced water treatment is required, wastewater treatment processes such as sand filtration and ozone treatment after biological wastewater treatment are added to remove the chromaticity and turbidity of wastewater. However, these additional processes are complex and require high maintenance costs.

DETAILED DESCRIPTION OF THE INVENTION

Problems to be Solved by the Invention

One object of the present invention is to provide an electrochemical advanced oxidation process combined with a membrane for effectively removing turbidity, chromaticity, and trace contaminants from wastewater based on the combination of membrane filtration and advanced oxidation.

A further object of the present invention is to provide an electrochemical advanced oxidation device combined with a membrane in which membrane filtration and advanced oxidation occur simultaneously in the same reaction vessel.

Another object of the present invention is to provide a water treatment system including the electrochemical advanced oxidation device.

Means for Solving the Problems

An electrochemical advanced oxidation process combined with a membrane according to the present invention includes: providing a membrane electro-oxidation tank where electrodes are combined with a membrane; accommodating wastewater containing pollutants in the membrane electro-oxidation tank; and supplying power to the electrodes to decompose the pollutants and simultaneously separating particles through the membrane (water treatment), wherein the electrodes are arranged downstream of the membrane and gases released from the electrodes induce a vertical flow of the fluid to improve the contact efficiency between a reactive solution and the electrodes and remove the pollutants attached to the surface of the membrane.

The process may further include circulating the reactive solution added to the pollutants in the treatment tank during or before and/or after the water treatment.

The process may further include spraying the reactive solution or air into the treatment tank.

Nozzles may be disposed downstream of the electrodes and a blower for rapid supply of the fluid may be connected to the nozzles to spray the reactive solution or air through the nozzles.

An electrochemical advanced oxidation device combined with a membrane according to the present invention includes: a membrane filtration unit provided in a treatment tank in which wastewater containing pollutants is accommodated and through which the pollutants pass and are filtered; an electrolysis unit provided in the treatment tank and supplying power to decompose the pollutants based on oxidation and reduction; and a frame interposed between the upstream membrane filtration unit and the downstream electrolysis unit such that the membrane filtration unit and the electrolysis unit are fixedly spaced a predetermined distance from each other, wherein when the electrolysis unit is driven, gases released by the electrolysis induce a vertical flow of the fluid to remove the pollutants attached to the surface of the membrane.

The membrane filtration unit may be a submerged module in the form of a flat sheet, hollow fiber or tube.

The membrane filtration unit may include a ceramic or metal-based inorganic membrane and a Teflon-based chemical resistant organic membrane.

The electrolysis unit may include a power supply, an anode, and a cathode, and the anode may be composed of titanium (Ti), iridium (Ir), ruthenium (Ru), stannum (Sn), tantalum (Ta), bismuth (Bi), carbon (C), boron (B), iron (Fe), aluminum (Al) or a mixture thereof.

The electrolysis unit may include a power supply, an anode, and a cathode, and the cathode may be composed of titanium (Ti), iridium (Ir), ruthenium (Ru), stannum (Sn), tantalum (Ta), bismuth (Bi), carbon (C), boron (B), iron (Fe), aluminum (Al), stainless steel or a mixture thereof.

A water treatment system of the present invention includes: a treatment tank in which wastewater containing pollutants is accommodated; a membrane filtration unit provided in the treatment tank and through which the pollutants pass and the pollutant particles are filtered; and an electrolysis unit provided in the treatment tank and supplying power to decompose the pollutants based on oxidation and reduction, wherein the electrolysis unit is located downstream of the filtration unit such that gases released by the electrolysis induce a vertical flow of the fluid.

The water treatment system may further include a reactive solution circulating unit adapted to suck the pollutants from the treatment tank and resupplying the sucked pollutants to the treatment tank to stir a reactive electrolyte solution.

The water treatment system of the present invention may further include an air circulating unit adapted to spray the fluid into the treatment tank.

The air circulating unit may include a blower adapted to forcibly circulate a flow of the fluid and nozzles adapted to uniformly spray the fluid supplied through the blower wherein the nozzles are located downstream of the membrane filtration unit or the electrolysis unit.

Another aspect of the present invention provides a water treatment system including a treatment tank in which wastewater containing pollutants is accommodated and the electrochemical advanced oxidation device provided in the treatment tank wherein the electrochemical advanced oxidation device is provided in plurality.

Effects of the Invention

According to the present invention, a mechanism of decomposing pollutants using the electrodes and a mechanism of separating particles through the membrane take place simultaneously in the membrane electro-oxidation tank as a combination of the electrolysis unit and the membrane filtration unit.

In addition, the electrolysis unit is arranged downstream of the membrane filtration unit in the same membrane electro-oxidation tank. This arrangement allows gases produced from the electrodes to remove pollutants attached to the surface of the membrane.

Furthermore, the reactive solution circulating unit enables effective contact between the electrodes and a reactive solution and the air circulating unit sprays a reactive solution or air on the upstream electrolysis unit to achieve improved reactivity and enable more effective removal of pollutants attached to the surface of the membrane.

That is, the water treatment system of the present invention is based on a water treatment process integrated with membrane filtration and electrolysis in the same treatment tank so that pollutants can be effectively removed and separated and the membrane can be highly protected from being contaminated by pollutants. Therefore, the water treatment system of the present invention can effectively remove trace contaminants in wastewater such as industrial wastewater and hardly degradable wastewater and materials causing chemical oxygen demand, total organic carbon, chromaticity, and turbidity.

Moreover, the electrochemical advanced oxidation device of the present invention in the form of a cartridge may be provided in plurality depending on the required wastewater treatment capacity. In this case, the electrochemical advanced oxidation devices can be detachably mounted in the treatment tank. Therefore, the use of the electrochemical advanced oxidation devices ensures high capacity of the water treatment system and facilitates maintenance and repair of the water treatment system.

BRIEF DESCRIPTION OF THE DRAWINGS

FIG. 1 is a schematic diagram illustrating the constitution of a water treatment system using an electrochemical advanced oxidation device combined with a membrane according to the present invention.

FIG. 2 is a schematic diagram illustrating the constitution of a water treatment system according to a further embodiment of the present invention.

FIG. 3 is a photograph showing a water treatment system using an electrochemical advanced oxidation device combined with a membrane according to one embodiment of the present invention.

FIG. 4 schematically illustrates the constitution of a high capacity water treatment system using a plurality of electrochemical advanced oxidation devices combined with membranes.

FIGS. 5 and 6 show removal rates of 1,4-dioxane, COD, and TOC from artificial wastewater (containing 400 ppm 1,4-dioxane) when a water treatment system of the present invention was used.

FIGS. 7 and 8 show removal rates of 1,4-dioxane, COD, and TOC from actual wastewater when a water treatment system of the present invention was used.

FIG. 9 shows time-dependent changes in the chromaticity and turbidity of wastewater depending on their removal rates and results of evaluation of membrane contamination with time when a water treatment system according to one embodiment of the present invention was used.

FIG. 10 shows time-dependent changes in the chromaticity and turbidity of wastewater depending on their removal rates and results of evaluation of membrane contamination with time when a water treatment system according to a further embodiment of the present invention was used.

| * Explanation of main reference numerals | | | |
|---|---|---|---|
| 100 | Treatment tank | 200 | Electrolysis unit |
| 220 | Power supply | 300 | Frame |
| 400 | Membrane filtration unit | 600 | Pump |
| 610 | Discharge pipe | 700 | Air circulating unit |
| 800 | Reactive solution circulating unit | | |

MODE FOR CARRYING OUT THE INVENTION

Embodiments of the present invention will now be described with reference to the accompanying drawings. However, the spirit of the present invention is not limited to embodiments set forth herein and those skilled in the art who understand the spirit of the present invention can easily suggest other embodiments within the scope of the same spirit.

FIG. 1 is a schematic diagram illustrating the constitution of a water treatment system using an electrochemical advanced oxidation device combined with a membrane according to the present invention.

Referring to FIG. 1, the water treatment system using an electrochemical advanced oxidation device combined with a membrane (hereinafter referred to simply as "water treatment system") includes a treatment tank 100 in which a membrane filtration unit 400 and an electrolysis unit 200 are arranged. Due to this constitution, membrane filtration and electrochemical advanced oxidation occur simultaneously.

A target fluid enters the treatment tank 100 through an inlet 110 and is accommodated in the treatment tank 100. The membrane filtration unit 400 and the electrolysis unit 200 are provided in the internal space of the treatment tank 100 in which the target fluid is accommodated.

The membrane filtration unit 400 is a submerged module and can be selected from various structures such as flat sheets, hollow fibers, and tubes. The membrane filtration unit 400 is located relatively high in the internal space of the treatment tank 100.

An outlet (not illustrated) is further formed at one side of the membrane filtration unit 400. The fluid filtered through the membrane escapes through the outlet. The treated fluid is discharged to the outside through a treated water discharge unit connected to the outlet.

The treated water discharge unit may optionally further include a discharge pipe 610 adapted to guide a discharge passage of the treated fluid. A pump 600 adapted to forcibly discharge the treated fluid or a valve (not illustrated) coupled to one side of the discharge pipe 610 to control the degree of opening of the discharge pipe 610 may be optionally provided depending on the discharge passage.

In this embodiment, the treated water discharge unit is configured to include the discharge pipe 610 and the pump 600 connected to the discharge pipe 610 such that the flow rate of the treated fluid discharged is adjustable under the control of the pump 600.

The membrane filtration unit 400 includes a ceramic or metal-based inorganic membrane and a Teflon-based chemical resistant organic membrane. Due to this construction, the membrane filtration unit 400 can separate both organic and inorganic matter.

In the treatment tank 100, the electrolysis unit 200 is provided downstream of the membrane filtration unit 400.

The electrolysis unit 200 includes a power supply 220, electrodes receiving electricity from the power supply 220 to cause oxidation and reduction reactions to occur in the treatment tank 100, and a reactive solution feeder (not illustrated) adapted to supply an electrolyte. The electrodes are an anode composed of titanium (Ti), iridium (Ir), ruthenium (Ru), stannum (Sn), tantalum (Ta), bismuth (Bi), carbon (C), boron (B), iron (Fe), aluminum (Al) or a mixture thereof and a cathode composed of titanium (Ti), iridium (Ir), ruthenium (Ru), stannum (Sn), tantalum (Ta), bismuth (Bi), carbon (C), boron (B), iron (Fe), aluminum (Al), stainless steel or a mixture thereof.

The electrode materials can stabilize the structures of the corresponding electrodes and can promote the formation of radicals. The electrodes made using the corresponding materials decompose various pollutants by oxidation and reduction when power is supplied thereto.

That is, the water treatment system of the present invention can more effectively decompose pollutants based on both direct oxidation and indirect oxidation. According to the direct oxidation, pollutants can be decomposed by electron transfer between hydroxyl radicals adsorbed to the surface of the electrodes. According to the indirect oxidation, pollutants can be decomposed by strong oxidants such as hypochlorous acid (HClO), ozone ($O_3$), hydrogen peroxide ($H_2O_2$) or oxidized metal ions that may be produced by electrolysis.

The electrodes are located downstream of the membrane filtration unit 400, as described above. When power is applied from the power supply 220 to the electrodes, oxidation and reduction reactions occur to produce gases, which are supplied to the membrane filtration unit 400. This gas supply improves the contact efficiency between a reactive solution and the electrodes and enables the removal of pollutants attached to the surface of the membrane.

Although not illustrated, a sensor may be further provided in the electrolysis unit 200 to check the molarity of the electrolyte in the treatment tank 100. In response to information detected by the sensor, the reactive solution feeder (not illustrated) is controlled such that the molarity of the electrolyte in the treatment tank is automatically adjustable.

FIG. 2 is a schematic diagram illustrating the constitution of a water treatment system according to a further embodiment of the present invention.

Referring to FIG. 2, the water treatment system further includes a reactive solution circulating unit 800 adapted to circulate the reactive solution in the treatment tank 100 to improve the reaction efficiency and an air circulating unit 700 adapted to more effectively remove pollutants attached to the surface of the membrane.

Specifically, the air circulating unit 700 includes a circulation pump and a plurality of pipes. The air circulating unit 700 sucks a fluid from the treatment tank 100 and resupplies the sucked fluid so that a reactive solution supplied to the treatment tank 100 an be more uniformly distributed.

The air circulating unit 700 includes a blower 720 adapted to forcibly circulate a flow of the fluid, nozzles 740 connected to the blower to uniformly distribute the fluid supplied through the blower, and pipes connecting the blower to the nozzles. The nozzles 740 are located downstream of the membrane filtration unit 200 or the electrolysis unit 400.

Accordingly, the fluid can be rapidly supplied through the blower 720 and larger amounts of gases can be uniformly sprayed from the downstream electrolysis unit 200 or membrane filtration unit 400.

The reactive solution circulating unit 800 may be connected to the pipe between the blower 720 and the nozzles 740.

The fluid sucked through the reactive solution circulating unit 800 is uniformly sprayed on the upstream electrolysis unit 200 or membrane filtration unit 400, achieving improved reactivity. The reactive solution is directly sprayed on the surface of the membrane, enabling more effective removal of pollutants.

That is, spraying of the reactive solution or gases on the electrolysis unit 200 and/or the electrolysis unit 200 through the air circulating unit 700 contributes to further improvement of reactivity.

FIG. 3 is a photograph showing a water treatment system using an electrochemical advanced oxidation device combined with a membrane according to one embodiment of the present invention.

Referring to FIG. 3, the electrochemical advanced oxidation device as an essential assembly of the water treatment system is in the form of a cartridge and is mounted in the treatment tank 100 of the water treatment system.

Specifically, the membrane filtration unit 400 and the electrolysis unit 200 of the electrochemical advanced oxidation device in the form of a cartridge are fixed using a frame 300 for their vertical arrangement. The functions of the membrane filtration unit 400 and the electrolysis unit 200 are the same as those described above.

For this vertical arrangement, the frame 300 may at least consist of a pair of side frames having recesses or holes into which both left and right ends of each of the membrane filtration unit 400 and the electrolysis unit 200 are fitted and mounted. For better fixation of the membrane filtration unit 400 and the electrolysis unit 200, the frame 300 include an upper frame or a lower frame connecting the pair of side frames.

Although not illustrated, a holder may be further formed on the frame 300 to fixedly latch the upper end of the treatment tank 100. A protrusion or hook may be further formed to arrange the power supply lines and the pipes.

The electrochemical advanced oxidation device may be provided in plurality depending on the size and treatment capacity of the treatment tank 100. In this case, the electrochemical advanced oxidation devices can ensure higher water treatment efficiency.

FIG. 4 schematically illustrates the constitution of a high capacity water treatment system using a plurality of electrochemical advanced oxidation devices combined with membranes.

In the high capacity of the water treatment system illustrated in FIG. 4, a plurality of electrochemical advanced oxidation devices in the form of cartridges are arranged at uniform intervals in the treatment tank 100. With this arrangement, the water treatment system can be configured to filter a large amount of treated water.

In this embodiment, the electrolysis unit 200 is mounted in each frame 300 and is connected in series with the corresponding power supply 220 (see FIG. 1 or 2) such that the electrolysis unit 200 cooperates with the power supply 220 or is controllable through the corresponding power supply 220.

In each air circulating unit 700 (see FIG. 2), a fluid diverges from one blower 720 (see FIG. 2) into the nozzles 740. Thus, the air circulating units 700 operate simultaneously or are individually controllable through the individual blowers 720.

When the high capacity water treatment system is constructed such that the electrochemical advanced oxidation devices in the form of cartridges are individually controllable, maintenance and repair of the water treatment system is enabled without the need to stop the water treatment system.

That is, in this embodiment, devices in need of maintenance and repair are individually detached, sequentially repaired, and remounted during operation of the water treatment system. Therefore, the water treatment system is easier to maintain and manage but can be more stably maintained.

An electrochemical advanced oxidation process combined with a membrane according to the present invention will be described based on the above-described embodiments.

The electrochemical advanced oxidation process of the present invention includes: providing a membrane electro-oxidation tank where electrodes are combined with a membrane; accommodating wastewater containing pollutants in the membrane electro-oxidation tank; and supplying power to the electrodes to decompose the pollutants and simultaneously separating particles through the membrane (water treatment).

The electrodes are arranged downstream of the membrane such that gases released from the electrodes induce a vertical flow of the fluid to improve the contact efficiency between a reactive solution and the electrodes.

The process of the present invention further includes circulating the reactive solution in the treatment tank or spraying the reactive solution or air into the treatment tank during or before and/or after the water treatment.

When the reactive solution is circulated, a reactive solution circulating unit 800 adapted to suck pollutants from the membrane electro-oxidation tank 100 and circulate the sucked pollutants is used to stir the pollutants in the membrane electro-oxidation tank 100, achieving improved reactivity.

Nozzles 740 may be disposed downstream of the electrodes and a blower 720 for rapid supply of the fluid may be connected to the nozzles to spray air through the nozzles. The reactive solution circulating unit 800 is connected to a pipe connecting the blower 720 to the nozzles 740 so that the fluid forcibly supplied by the blower 720 together with the reactive solution can be sprayed through the nozzles 740.

The process of the present invention may further include controlling the concentration of an electrolyte as the reactive solution before the water treatment.

The concentration of the electrolyte is controlled by detecting the molarity of the electrolyte in the treatment tank 100 using a sensor and supplying new pollutants or electrolyte.

After completion of the water treatment, the treated water may be discharged.

The treated water having passed through the membrane is discharged using a treated water discharge unit including a pump 600 and a discharge pipe 610.

Tests using the water treatment system of the present invention and the obtained test results will be explained hereinafter.

First, artificial wastewater was prepared. The concentration of the artificial wastewater was adjusted to 400 mg/L corresponding to the concentration of 1,4-dioxane in actual chemical industrial wastewater. A 4 mM NaCl solution as an electrolyte was added to the artificial wastewater such that a current of electricity was allowed flow through the artificial wastewater for electrode reactions.

The molarity of the electrolyte was determined by calculating the ionic conductivity of NaCl relative to the electrical conductivity (0.5 mS/cm) of actual chemical industrial wastewater. The chemical oxygen demand (COD) and the total organic carbon (TOC) of artificial raw water were ~818 mg/L and 218 mg/L, respectively.

Chemical industrial wastewater was sampled from the 1,4-dioxane-containing industrial wastewater treatment process of Company A where wastewater was treated in an ozone oxidation treatment tank, mixed with wastewater from other processes in an aeration tank, finally treated with active sludge, settled in a settlement tank, and discharged.

The concentration of 1,4-dioxane after the ozone oxidation treatment was ≤0.2 mg/L and that of 1,4-dioxane in the wastewater effluent was ≤0.01 mg/L. Table 1 shows the properties of the chemical industrial wastewater.

TABLE 1

Properties and composition of the chemical industrial wastewater from Company A

| Property | Value |
| --- | --- |
| pH | 4.62 ± 0.5 |
| Electrical conductivity, μs/cm | 542 ± 10 |
| CODcr, mg/L | 14,044 ± 422 |
| TOC, mg/L | 4,815 ± 7 |
| 1,4-dioxane, mg/L | 386 ± 10 |
| Cl$^-$, mg/L | 260 |
| NO$_3^-$, mg/L | 395 |

The water treatment system of the present invention was investigated for chromaticity removal efficiency. First, phosphorus-containing treated water was collected from the industrial wastewater treatment plant of Company B where industrial wastewater was biologically treated, secondarily settled, and subjected to advanced water treatment through a total phosphorus treatment facility, a sand filter pond, and an ozone contact pond for chromaticity, total phosphorus, and turbidity removal. The phosphorus-containing treated water whose chromaticity remained unremoved after the advanced treatment was used to evaluate the water treatment system of the present invention. The properties of the treated water from the wastewater treatment plant of Company B are shown in Table 2.

TABLE 2

Properties and composition of the chemical industrial wastewater from Company B

| Property | Value |
| --- | --- |
| pH | 7.2 ± 0.2 |
| Electrical conductivity, ms/cm | 2.8 ± 0.3 |
| CODcr, mg/L | 40 ± 3 |

TABLE 2-continued

Properties and composition of the chemical industrial wastewater from Company B

| Property | Value |
| --- | --- |
| TOC, mg/L | 11 ± 0.5 |
| Chromaticity, Pt—Co unit | 125 ± 5 |
| Total phosphorus, mg/L | 0.15 |
| Total nitrogen, mg/L | 6.5 ± 1 |

The water treatment system was fabricated on a laboratory scale and batch experiments were conducted on the artificial wastewater and the actual wastewater. The volume of the reactor was 10 L. The membrane made of an alumina-based ceramic material was arranged on the electrodes to investigate optimum operating conditions for minimizing the contamination of the membrane by OH radicals generated by electrode reactions.

The anode was made of IrO$_2$/Ti and the cathode was made of stainless steel. The area of each electrode was 2,200 cm$^2$. The area and transmittance of the membrane were 1,056 cm$^2$ and 30 L/m$^2$·h, respectively.

The water treatment system was operated in an air mixing (aeration) mode. Air was supplied at a rate of 1 L/min and the specific aeration demand per membrane area was 0.568 m$^3$/m$^2$·h. The removal rate of 1,4-dioxane from the artificial wastewater was measured. The removal rates of 1,4-dioxane, COD and TOC from the chemical industrial wastewater were analyzed. The operating voltage for the electrochemical reactions was 4 V. Samples were collected at various time intervals (see Table 3).

TABLE 3

| Parameter | Value |
| --- | --- |
| Electrode area, cm$^2$ | 2,200 |
| Voltage, V | 4 |
| Membrane area, cm$^2$ | 1,056 |
| LMH, L/m$^2$h | 30 |
| Aeration intensity, L/min | 1 |
| Reaction volume, L | 10 |
| Anode | IrO$_2$/Ti |
| Cathode | Stainless steel |

Experiments were conducted under different conditions to evaluate the contamination of the membrane of the water treatment system and the removal rate of chromaticity by the water treatment system.

First, only the ceramic membrane was operated without applying an electric current to the electrodes to evaluate the influence of the electrodes on the membrane contamination. For comparison, an electric current was applied to the electrodes. The water treatment system was operated in a batch reactor mode under the same conditions as described above to evaluate the treatment efficiency. The effects of the reactive solution circulation were compared with those of the air circulation (see Table 4).

TABLE 4

| Parameter | Batch reactor mode | |
| --- | --- | --- |
| | Air circulation | Reactive solution circulation |
| Electrode area, cm$^2$ | 2,200 | 2,200 |
| Current, V | 5 | 5 |
| Membrane area, cm$^2$ | 1,056 | 1,056 |
| LMH, L/m$^2$h | 30 | 30 |

TABLE 4-continued

| | Batch reactor mode | |
|---|---|---|
| Parameter | Air circulation | Reactive solution circulation |
| Aeration intensity, L/min | 1 | — |
| Reactive solution circulation, mL/min | — | 250 |
| Reaction time, h | 12 | 16 |
| Reaction volume, L | 10 | 10 |
| Anode | $IrO_2/Ti$ | $IrO_2/Ti$ |
| Cathode | Stainless steel | Stainless steel |

The obtained test results will be discussed with reference to the accompanying drawings.

FIGS. 5 and 6 show the removal rates of 1,4-dioxane, COD, and TOC from the artificial wastewater (containing 400 ppm 1,4-dioxane) when the water treatment system of the present invention was used.

In FIG. 5, (a) shows that the removal rate of 400 ppm 1,4-dioxane from the artificial wastewater reached ~50% and (b) shows that the COD removal rate was ~40%. In FIG. 6, (c) shows that the TOC removal rate reached ~25%. The COD removal showed a similar tendency to the TOC removal.

The degree of contamination of the membrane of the water treatment system was measured. The transmembrane pressure of the membrane was ≤1 kPa, indicating no substantial contamination of the membrane.

FIGS. 7 and 8 show the removal rates of 1,4-dioxane, COD, and TOC from the actual wastewater when the water treatment system of the present invention was used.

(a) of FIG. 7 shows that the removal rate of 1,4-dioxane from the actual wastewater A reached ~80% after a 58 h-reaction.

(b) and (c) of FIG. 7 show that the COD removal rate and the TOC removal rate were ~70% and ~40%, respectively. (d) of FIG. 6 shows that the transmembrane pressure was changed in the range of 0.4-1.0 kPa, indicating insignificant contamination of the membrane. The turbidity of the raw water was 20.1±0.5 NTU and the turbidity in the reactor after a 28 h-reaction was reduced to 8.75±0.6 NTU. The turbidity of the water having passed through the membrane was 0.142±0.01 NTU. These results reveal that the removal rates of the pollutants from the raw water and the water having passed through the membrane were ~56.5 and ~99.3%, respectively. Particulates were almost completely removed from the raw water by the electrochemical reactions and the membrane separation.

FIG. 9 shows time-dependent changes in the chromaticity and turbidity of the wastewater depending on their removal rates and results of evaluation of membrane contamination with time when the water treatment system was used.

Referring to FIG. 9, when only the ceramic membrane was connected without applying an electric current to the electrodes and air was circulated, the chromaticity was not substantially removed (≤5%). ~80% of the initial turbidity was removed by filtration through the membrane.

The transmembrane pressure increased gradually to 15.1 kPa after a 16-h reaction.

When electricity was supplied to evaluate the efficiency of the electrochemical reactions under constant current and voltage conditions (5.00 A/5.1 V), the chromaticity of the raw water was reduced from 120 Pt—Co units to 10 Pt—Co units after a 15-h reaction, indicating that ≥90% of the initial chromaticity was removed. The turbidity removal rate was 90%.

The transmembrane pressure increased slightly at the initial stage, and thereafter, it was maintained constant at 5 kPa without further increase. The advanced oxidation by the electrodes resulted in increased chromaticity and turbidity and significantly decreased the membrane contamination.

FIG. 10 shows time-dependent changes in the chromaticity and turbidity of the wastewater depending on their removal rates and results of evaluation of membrane contamination with time when a water treatment system according to a further embodiment of the present invention was used.

Specifically, FIG. 10 shows changes in chromaticity, turbidity, and transmembrane pressure with increasing operating time. As can be seen from FIG. 10, the batch reactor mode greatly affected the removal of chromaticity.

For the aeration mode, ~40% of the initial chromaticity was removed after a 2-h reaction. When the reactive solution was circulated, the chromaticity decreased from 120 to 20 or less (removal rate ≥80%) within 2 h.

The turbidity of the treated water was reduced to the level of 0.1 NTU or less by filtration through the membrane and the circulation of the reactive solution was also effective in removing the particles. These results can lead to the conclusion that the water treatment process of the present invention is very effective in removing chromaticity and turbidity as well as particular hazardous substances (e.g., 1,4-dioxane).

In both experiments, the transmembrane pressure did not increase above 0.5 kPa. The initial reaction rate was not believed to significantly affect an increase in membrane contamination.

The primary reaction rates were calculated from the chromaticity removal rates obtained when the water treatment systems were operated in different modes. As a result, the reaction rate (0.492 $h^{-1}$) in the aeration mode was about twice higher than that (0.909 $h^{-1}$) obtained when the reactive solution was circulated. From these results, it was concluded that air bubbles formed during aeration hindered the electrode reactions.

The invention claimed is:

1. A method of an electrochemical oxidation process, comprising:
    disposing a membrane filter, a plurality of electrodes, and a nozzle within a membrane electro-oxidation tank;
    supplying a wastewater containing pollutants into the membrane electro-oxidation tank;
    supplying power to the plurality of electrodes to decompose the pollutants to generate gases and simultaneously to filter the wastewater through the membrane filter;
    generating a flow of the wastewater filtered through the membrane filter by a pump connected to the membrane filter; and
    supplying a reactive solution comprising an electrolyte or an air through the nozzle to the membrane electro-oxidation tank during or before and/or after the supplying the power;
    wherein a flow of the gases generated at the plurality of electrodes is perpendicular to the flow of the wastewater filtered through the membrane filter, and
    wherein the plurality of electrodes are disposed under the membrane filter and the nozzle is disposed under the plurality of electrodes such that the reactive solution or the air flows from the nozzle to the plurality of electrodes, merges with the gases generated by the plurality of electrodes, and flows to the membrane filter.

2. The method according to claim 1, wherein a blower is connected to the nozzle to supply the reactive solution or the air to the nozzle.

3. A device for an electrochemical oxidation, comprising:
   a membrane filter disposed in a treatment tank to which a wastewater containing pollutants is supplied and through which the pollutants pass and are filtered;
   a plurality of electrodes disposed under the membrane filter in the treatment tank and connected to a power supply supplying a power to the plurality of electrodes to decompose the pollutants to generate gases;
   a nozzle disposed under the plurality of electrodes supplying a reactive solution comprising an electrolyte or an air to the treatment tank during or before and/or after the supplying the power;
   a frame for fixing the membrane filter and the plurality of electrodes to be spaced with a predetermined distance from each other; and
   a pump connected to the membrane filter and generating a flow of the wastewater filtered through the membrane filter;
   wherein a flow of the gases generated at the plurality of electrodes is perpendicular to the flow of the wastewater filtered through the membrane filter, and
   wherein the reactive solution or the air flows from the nozzle to the plurality of electrodes, merges with the gases generated by the plurality of electrodes, and flows to the membrane filter.

4. The device according to claim 3, wherein the membrane filter is a submerged module in a form of a flat sheet, a hollow fiber or a tube.

5. The device according to claim 3, wherein the membrane filter comprises a ceramic or a metal-based inorganic membrane and a Teflon-based chemical resistant organic membrane.

6. The device according to claim 3, wherein the plurality of electrodes comprises an anode and a cathode, and the anode comprises titanium (Ti), iridium (Ir), ruthenium (Ru), stannum (Sn), tantalum (Ta), bismuth (Bi), carbon (C), boron (B), iron (Fe), aluminum (Al) or a mixture thereof.

7. The device according to claim 3, wherein the plurality of electrodes comprises an anode and a cathode, and the cathode comprises titanium (Ti), iridium (Ir), ruthenium (Ru), stannum (Sn), tantalum (Ta), bismuth (Bi), carbon (C), boron (B), iron (Fe), aluminum (Al), stainless steel or a mixture thereof.

8. A water treatment system comprising:
   a treatment tank to which a wastewater containing pollutants is supplied;
   a membrane filter disposed in the treatment tank and through which the pollutants pass and the pollutant particles are filtered; and
   a plurality of electrodes disposed under the membrane filter in the treatment tank and connected to a power supply supplying a power to the plurality of electrodes to decompose the pollutants to generate gases;
   a nozzle disposed under the plurality of electrodes supplying a reactive solution comprising an electrolyte or an air to the treatment tank during or before and/or after the supplying the power; and
   a pump connected to the membrane filter and generating a flow of the wastewater filtered through the membrane filter
   wherein a flow of the gases generated at the plurality of electrodes is perpendicular to the flow of the wastewater filtered through the membrane filter, and
   wherein the reactive solution or the air flows from the nozzle to the plurality of electrodes, merges with the gases generated by the plurality of electrodes, and flows to the membrane filter.

9. The water treatment system according to claim 8, wherein a blower is connected to the nozzle to supply the reactive solution or the air to the nozzle.

10. The water treatment system according to claim 8, wherein the membrane filter and the plurality of electrodes are disposed in a plurality of cartridges, respectively, wherein the plurality of cartridges are arranged in the treatment tank at uniform intervals.

11. The method according to claim 1, further comprising:
    checking a molarity of the electrolyte in the membrane electro-oxidation tank; and
    controlling an amount of the reactive solution supplied in response to the molarity of the electrolyte checked.

12. The device according to claim 3, further comprising:
    a sensor disposed in the treatment tank to check a molarity of the electrolyte in the treatment tank; and
    a controller to change an amount of the reactive solution supplied by the nozzle in response to the molarity of the electrolyte checked.

13. The water treatment system according to claim 8, further comprising:
    a sensor disposed in the treatment tank to check a molarity of the electrolyte in the treatment tank; and
    a controller to change an amount of the reactive solution supplied by the reactive solution feeder in response to the molarity of the electrolyte checked.

* * * * *